(12) United States Patent
Ito et al.

(10) Patent No.:  US 12,663,311 B2
(45) Date of Patent:  Jun. 23, 2026

(54) DETECTION DEVICE

(71) Applicant: Magnolia White Corporation, Tokyo (JP)

(72) Inventors: Kaoru Ito, Tokyo (JP); Akihiko Fujisawa, Tokyo (JP); Daichi Abe, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 184 days.

(21) Appl. No.: 18/761,798

(22) Filed: Jul. 2, 2024

(65) Prior Publication Data

US 2025/0012631 A1     Jan. 9, 2025

(30) Foreign Application Priority Data

Jul. 7, 2023  (JP) .................................. 2023-112089

(51) Int. Cl.
*G01J 1/44*       (2006.01)
*G01N 21/31*      (2006.01)
(52) U.S. Cl.
CPC ................ *G01J 1/44* (2013.01); *G01N 21/31* (2013.01); *G01J 2001/446* (2013.01)
(58) Field of Classification Search
CPC ....... G01J 1/44; G01J 2001/446; G01N 21/31
See application file for complete search history.

(56) References Cited

U.S. PATENT DOCUMENTS 8,089,544 B2 * 1/2012 Funaki ................... H04N 25/57
                                                     348/308
10,468,439 B2 * 11/2019 Ikeda ................... H10F 55/207

FOREIGN PATENT DOCUMENTS

JP         2005087005 A      4/2005

* cited by examiner

*Primary Examiner* — Seung C Sohn
(74) *Attorney, Agent, or Firm* — K&L Gates LLP

(57)        ABSTRACT

According to an aspect, a detection device includes: sensors each of which includes a photodiode configured to detect light and is configured to generate an output corresponding to a degree of the detected light; and a detection circuit configured to receive the output of each sensor. The photodiode has an anode to which a reference potential is applied and a cathode to which a reset potential higher than the reference potential is applied. Each sensor is configured to generate the output corresponding to the degree of the light detected by the photodiode after the reset potential is applied to the cathode and before the reset potential is applied to the cathode again. The outputs of the sensors are received in a first period and a second period after the first period. The reference potential and the reset potential in the first period are different from those in the second period.

14 Claims, 7 Drawing Sheets

DETECTION DEVICE

CROSS-REFERENCE TO RELATED APPLICATION

This application claims the benefit of priority from Japanese Patent Application No. 2023-112089 filed on Jul. 7, 2023, the entire contents of which are incorporated herein by reference.

BACKGROUND

1. Technical Field

What is disclosed herein relates to a detection device.

2. Description of the Related Art

Detection devices are known which can detect the states of culture environments of biological tissues and microorganisms using optical sensors (refer to Japanese Patent Application Laid-open Publication No. 2005-87005, for example).

The dynamic range for detecting brightness and darkness of the exemplified detection device is constrained by a narrower one of a first dynamic range and a second dynamic range, wherein the first dynamic range is defined by the lower and upper limits of the output of the sensor including a photodetector, and the second dynamic range is defined by the lower and upper limits of the input of the circuit that receives the output of the sensor. When the second dynamic range is narrower than the first dynamic range, it is impossible for the sensor to make full use of its ability.

For the foregoing reasons, there is a need for a detection device that makes it possible for the sensor to make full use of its ability.

SUMMARY

According to an aspect, a detection device includes: a plurality of sensors each of which includes a photodiode configured to detect light and is configured to generate an output corresponding to a degree of the detected light; and a detection circuit that is configured to receive the output of each of the sensors. The photodiode has an anode to which a reference potential is applied and a cathode to which a reset potential is applied, and the reset potential is higher than the reference potential. Each of the sensors is configured to generate the output corresponding to the degree of the light detected by the photodiode after the reset potential is applied to the cathode and before the reset potential is applied to the cathode again. The outputs of the sensors are received in a first period, and the outputs of the sensors are received in a second period after the first period. The reference potential and the reset potential in the first period are different from those in the second period.

According to an aspect, a detection device includes: a plurality of sensors each of which includes a photodiode configured to detect light and is configured to generate an output corresponding to a degree of the detected light; and a detection circuit that is configured to receive the output of each of the sensors. The photodiode has an anode to which a reference potential is applied and a cathode to which a reset potential is applied, and the reset potential is higher than the reference potential. A configuration that functions as an electrical resistor is interposed between each of the sensors and the detection circuit. A current source that is configured to provide a bias current is coupled to a coupling path between the electrical resistor and the detection circuit. The outputs of the sensors are received in a first period, and the outputs of the sensors are received in a second period after the first period. The bias current in the first period is different from that in the second period.

DETAILED DESCRIPTION

Figure 1:
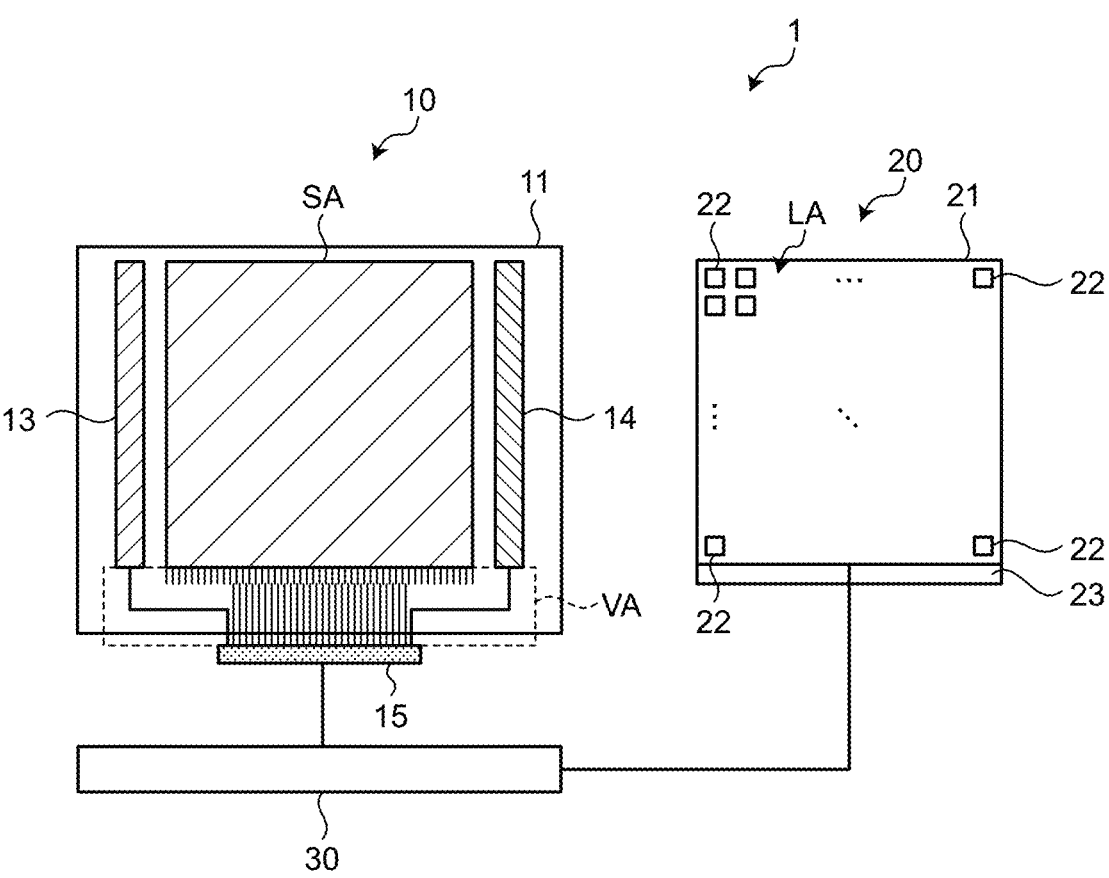
FIG. 1 is a diagram illustrating a major configuration of a detection device.

The following describes an embodiment of the present disclosure with reference to the accompanying drawings. What is disclosed herein is merely an example, and the present disclosure naturally encompasses appropriate modifications easily conceivable by those skilled in the art while maintaining the gist of the invention. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present specification and the drawings, and detailed description thereof may not be repeated where appropriate.

In this disclosure, when an element is described as being "on" another element, the element can be directly on the other element, or there can be one or more elements between the element and the other element.

FIG. 1 is a diagram illustrating a major configuration of a detection device 1. The detection device 1 includes a sensor panel 10 and a light source panel 20. The sensor panel 10 and the light source panel 20 are coupled to a host 30.

The sensor panel 10 has a detection region SA (refer to FIG. 2) on a substrate 11. The substrate 11 has a reset circuit 13, a scan circuit 14, and a wiring region VA that are mounted thereon. The configuration on the detection region SA, the reset circuit 13, and the scan circuit 14 are coupled to a detection circuit 15 via the wiring region VA.

The light source panel 20 has a light emitting region LA that illuminates the detection region SA. The light source panel 20 has light sources 22 on a substrate 21. The light sources 22, which are light emitting devices such as light emitting diodes (LEDs), are arranged in the light emitting region LA. In the example illustrated in FIG. 1, the light sources 22 are arranged in a matrix having a row-column configuration on the substrate 21.

The light sources 22 are individually controllable to emit light. The light source panel 20 is provided with a light source drive circuit 23. Under the control of the host 30, the light source drive circuit 23 controls turning on and off of each of the light sources 22 and the luminance of the light source 22 when the light source 22 is on.

The host 30 performs various controls related to the operation of the detection device 1. Specifically, the host 30 is a micro-controller for the configuration of the detection device 1 or is an information processor that functions in the same manner as the micro-controller, for example. The host 30 is coupled to the detection circuit 15 via a standardized interface such as a serial peripheral interface (SPI) and receives output from the detection circuit 15. The host 30 is coupled to the light source drive circuit 23 via the standardized interface and performs processing related to the turning on of the light sources 22, such as determining a lighting pattern of the light sources 22.

Figure 2:
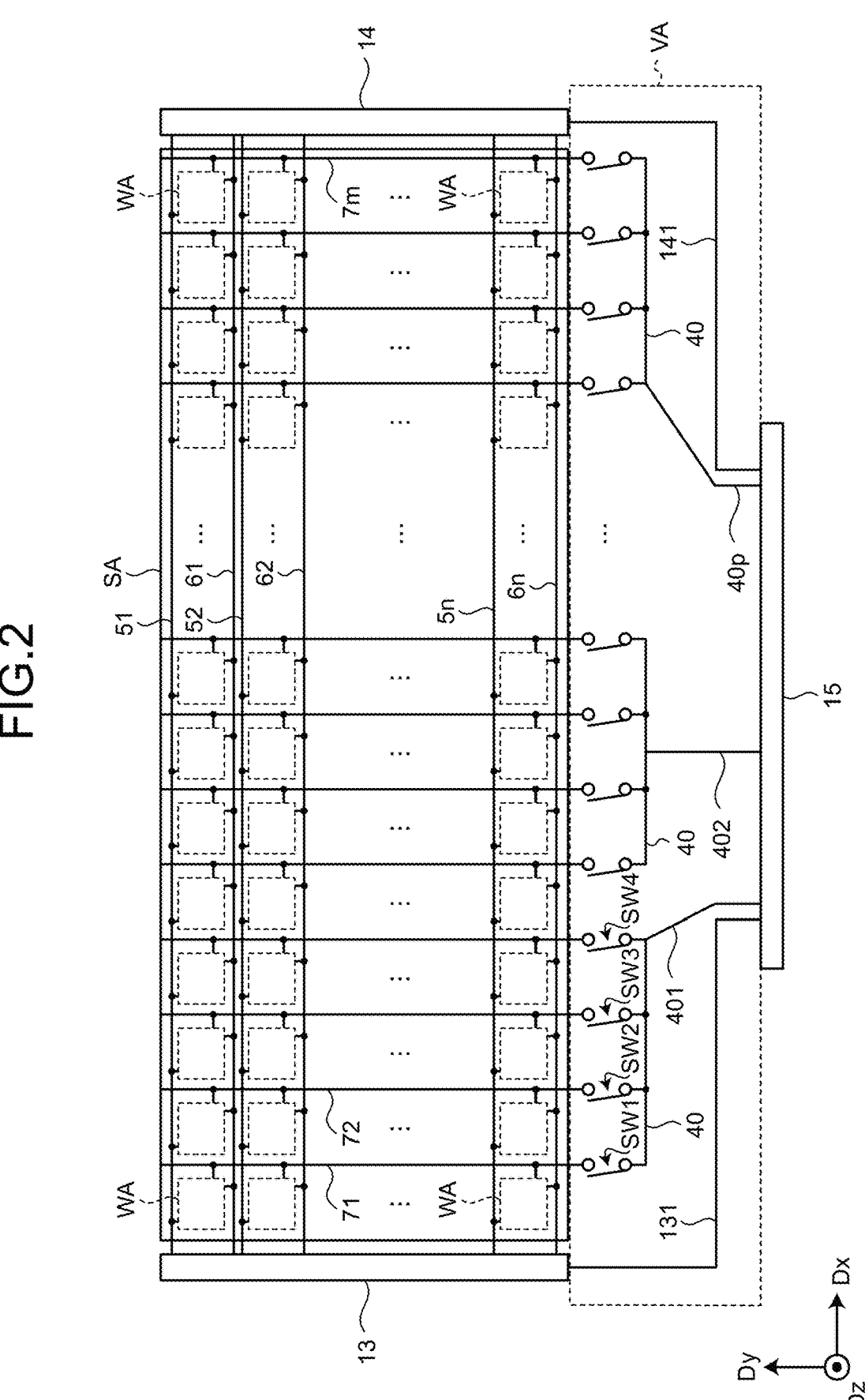
FIG. 2 is a diagram illustrating an exemplary configuration of a detection region and a wiring region.
Figure 3:
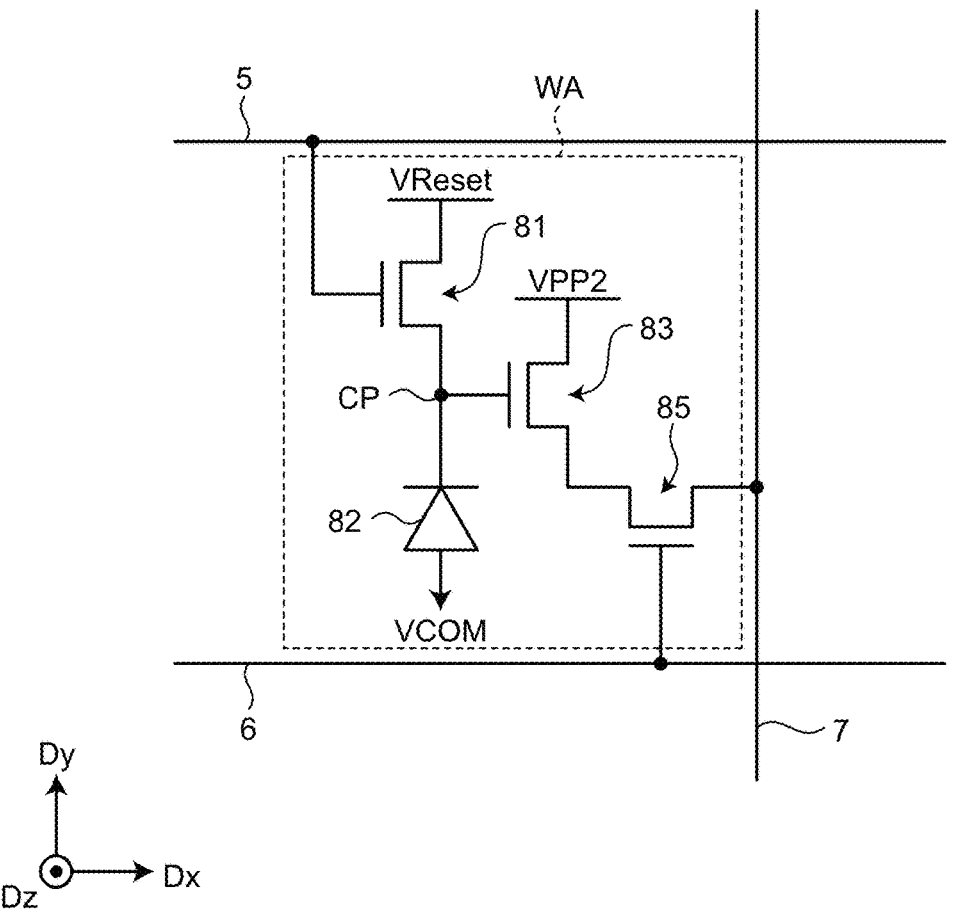
FIG. 3 is a circuit diagram illustrating a circuit configuration of a sensor.

FIG. 2 is a diagram illustrating an exemplary configuration of the detection region SA and the wiring region VA. The detection region SA is provided with a plurality of sensors WA (FIG. 3). In the embodiment, as illustrated in FIG. 2, the sensors WA are arranged in a matrix having a row-column configuration along the first direction Dx and the second direction Dy. The first direction Dx and the second direction Dy are orthogonal. The third direction Dz is orthogonal to the first direction Dx and the second direction Dy.

The reset circuit 13 is coupled to reset signal transmission lines 51, 52, . . . , 5n. Hereafter, the term "reset signal transmission line 5" refers to any of the reset signal transmission lines 51, 52, . . . , 5n. The reset signal transmission line 5 is the wiring line along the first direction Dx. In the example illustrated in FIG. 2, n reset signal transmission lines 5 are aligned in the second direction Dy. n is a natural number equal to or greater than 2. The n reset signal transmission lines 5 are each coupled to the reset circuit 13 at one end side in the first direction Dx.

The scan circuit 14 is coupled to scan lines 61, 62, . . . , 6n. Hereafter, the term "scan line 6" refers to any of the scan lines 61, 62, . . . , 6n. The scan line 6 is the wiring line along the first direction Dx. In the example illustrated in FIG. 2, n scan lines 6 are aligned in the second direction Dy. The n scan lines 6 are each coupled to the scan circuit 14 at the other end sides thereof in the first direction Dx.

As illustrated in FIG. 2, the reset signal transmission lines 5 and the scan lines 6 are alternately aligned in the second direction Dy in the detection region SA. The reset circuit 13 and the scan circuit 14 that are exemplary illustrated in FIGS. 1 and 2 are arranged on the opposite sides with the detection region SA therebetween, but the layout of the reset circuit 13 and scan circuit 14 is not limited to this and can be changed as needed.

Furthermore, in the detection region SA, signal lines 71, 72, . . . , 7m are provided. Hereinafter, the term "signal line 7" refers to any of the signal lines 71, 72, . . . , 7m. The signal line 7 is the wiring line along the second direction Dy. In the example illustrated in FIG. 2, m signal lines 7 are aligned in the first direction Dx. m is a natural number equal to or greater than 2. Each of the m signal lines 7 is coupled to one of a plurality of switches (e.g., switch SW1, switch SW2, switch SW3 or switch SW4) of selector circuits 40 on one end side in the second direction Dy.

The selector circuits 40 are provided in the wiring region VA. The selector circuit 40 has the multiple switches. In the example illustrated in FIG. 2, the switches SW1, SW2, SW3, and SW4 are illustrated as the multiple switches. The switches of the selector circuit 40 are turned on (in a coupled state) at different timings. During the period when one of the switches of the selector circuit 40 is ON (in the coupled state), the other switches are OFF (in an uncoupled state). The number of selector circuits 40 depends on the number (m) of signal lines 7. If the number of switches is p, the sufficient number of selector circuits 40 is m/p. When more than one selector circuit 40 are provided, each of the selector circuits 40 is individually coupled to the detection circuit 15 via a corresponding one of wiring lines 401, 402, . . . , 40p.

The coupling between each of the signal lines 7 and the detection circuit 15 via the selector circuits 40 is merely an example and is not limited to this example. The signal lines 7 may be individually directly coupled to the detection circuit 15 in the wiring region VA. In the wiring region VA, the reset circuit 13 is coupled to the detection circuit 15 via a wiring line 131. In the wiring region VA, the scan circuit 14 is coupled to the detection circuit 15 via a wiring line 141.

The detection circuit 15 controls the operation timings of the reset circuit 13 and the scan circuit 14 in relation to light detection by a PD 82 (refer to FIG. 3) provided in the sensor WA. The detection circuit 15 controls the timing of a reset period RT, an exposure period EX, and a readout period RD of the sensor WA, which are described later with reference to FIGS. 8 and 9. The outputs from the sensors WA are input to the detection circuit 15. The detection circuit 15 converts signals input from the sensors WA into data that can be interpreted by the host 30, and outputs the resulting data to the host 30. The detection circuit 15 in the embodiment is a readout integrated circuit (ROIC) of the sensors WA in the sensor panel 10.

FIG. 3 is a circuit diagram illustrating a circuit configuration of the sensor WA. The first direction Dx and the second direction Dy in FIG. 3 only correspond to the directions of the reset signal transmission line 5 and the scan line 6, and the signal line 7, respectively, and do not strictly indicate the relative positional relation in the circuit configuration of the sensor WA.

As illustrated in FIG. 3, the sensor WA includes a switching element 81, the PD 82, a transistor element 83, and a switching element 85. The PD 82 is a photo diode (PD). The switching element 81, the transistor element 83, and the switching element 85 are metal oxide semiconductor field effect transistors (MOSFETs).

The gate of the switching element 81 is coupled to the reset signal transmission line 5. A reset potential VReset is applied to one of the source and the drain of the switching element 81. The cathode of the PD 82 and the gate of the transistor element 83 are coupled to the other of the source and the drain of the switching element 81. Hereafter, the term "coupling part CP" refers to the point at which the other of the source and the drain of the switching element 81, the cathode of the PD 82, and the gate of the transistor element 83 are coupled. A reference potential VCOM is applied to the anode of the PD 82. The potential difference between the reset potential VReset and the reference potential VCOM is predetermined, but the potentials of the reset potential VReset and the reference potential VCOM may be variable. The reset potential VReset is higher than the reference potential VCOM.

An output source potential VPP2 is applied to the drain of the transistor element 83, which functions as a source follower. One of the source and the drain of the switching element 85 is coupled to the source of the transistor element 83. The other of the source and the drain of the switching element 85 is coupled to the signal line 7. The gate of the switching element 85 is coupled to the scan line 6.

The reset potential VReset, the reference potential VCOM, and the output source potential VPP2 are supplied by the detection circuit 15 to the sensor WA on the basis of electric power supplied via a power supply circuit, which is not illustrated, coupled to the detection circuit 15, for example. The supply manner is not limited to this and can be changed as needed.

The output source potential VPP2 is predetermined. The source potential of the transistor element 83 is lower than the output potential of the PD 82 by the voltage (Vth) between the gate and the source of the transistor element 83. The potential of the source of the transistor element 83, thus, depends on the reset potential VReset and the reference potential VCOM. The output potential of the PD 82 depends on photovoltaic power generated by the PD 82 corresponding to the light detected by the PD 82 during the exposure period EX, which is described later.

When the gate of the switching element 85 is turned on by the signal applied by the scan circuit 14 via the scan line 6, the source and the drain of the switching element 85 are coupled. This causes a signal (potential) transmitted to the switching element 85 via the transistor element 83 to be transmitted to the signal line 7 through the switching element 85. In this way, the sensor WA generates the output. Hereafter, the term "scan signal" refers to the signal (potential) applied by the scan circuit 14 via the scan line 6. The scan circuit 14 outputs the scan signal.

Figure 8:
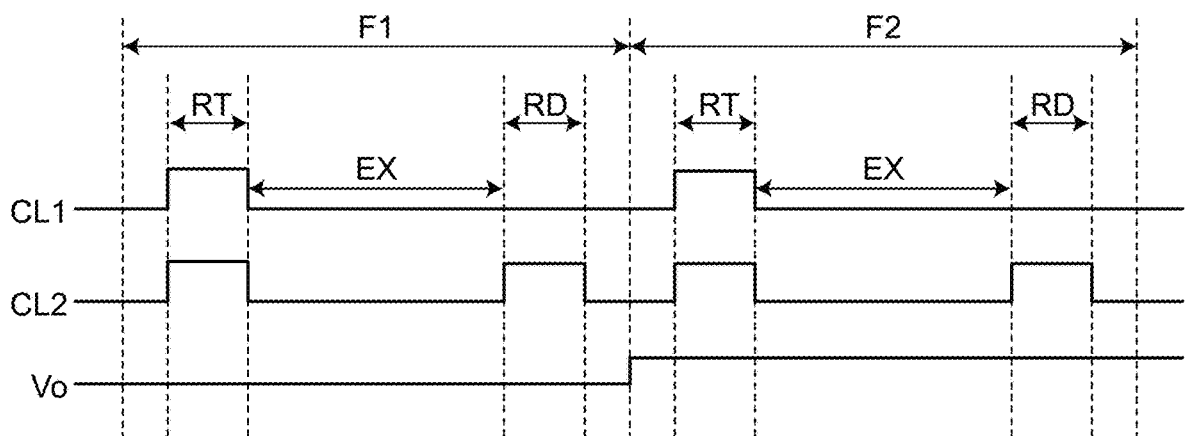
FIG. 8 is a timing chart illustrating an example of main signal control in a first period F1 and a second period F2 when a bias current is changed in a case where a clipped state occurs.
Figure 9:
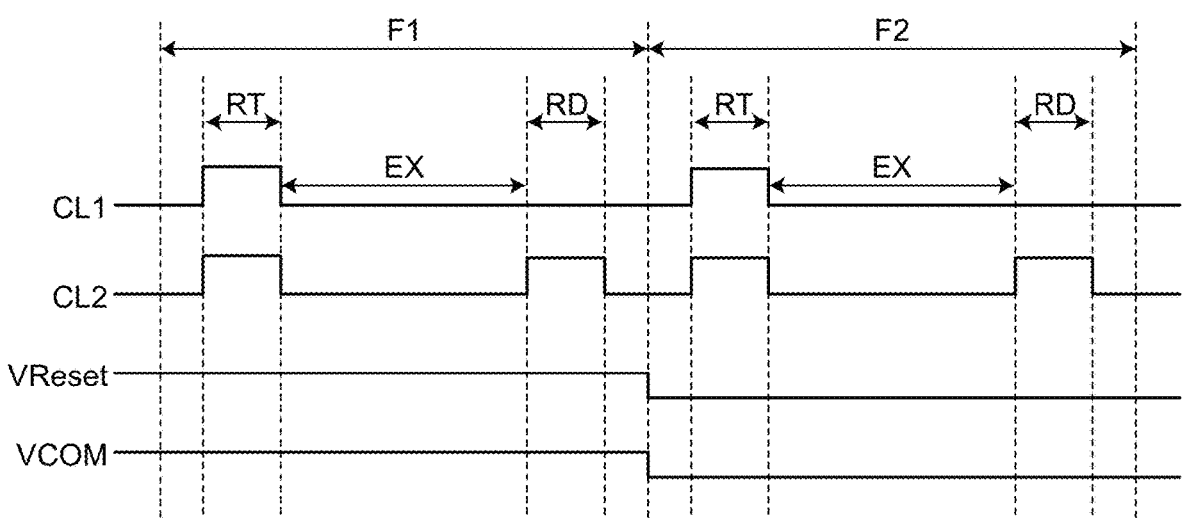
FIG. 9 is a timing chart illustrating an example of the main signal control in the first period F1 and second period F2 when an initial potential is changed in a case where the clipped state occurs.

The output of the PD 82 provided in the sensor WA depends on the intensity of light detected by that PD 82 within the predetermined exposure period EX (refer to FIGS. 8 and 9). The output of the PD 82 is reset in response to the signal applied by the reset circuit 13 via the reset signal transmission line 5. When the gate of the switching element 81 is turned on by the applied signal, the source and the drain of the switching element 81 are coupled. This causes the potential of the coupling part CP to become the reset potential VReset. Hereafter, the term "initial potential" refers to the reset potential VReset.

The term "reset signal" refers to the signal applied by the reset circuit 13 via the reset signal transmission line 5. The reset circuit 13 outputs the reset signal.

Figure 4:
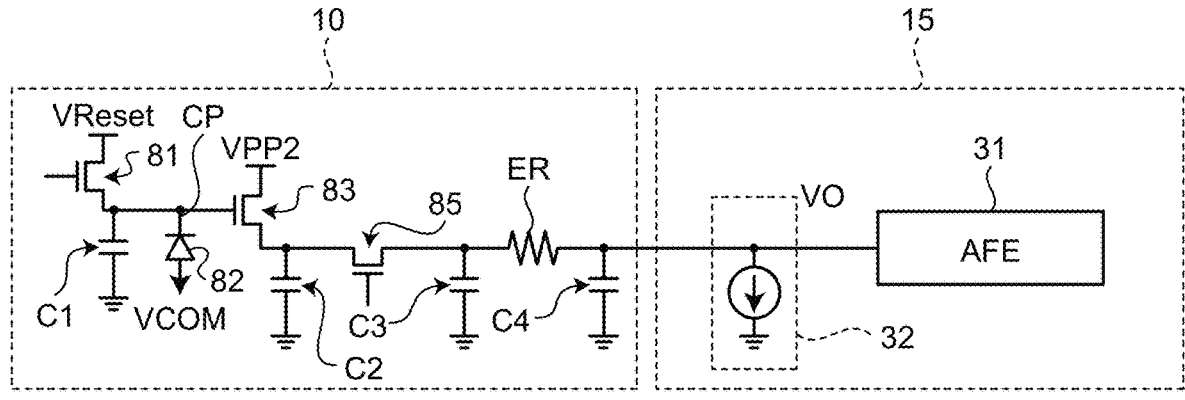
FIG. 4 is a circuit diagram illustrating an operation of a circuit related to an output of a signal to a signal line and transmission of the output to a detection circuit.

The following describes the details of the output of the signal to the signal line 7 and the transmission of the output to the detection circuit 15 with reference to FIG. 4.

FIG. 4 is a circuit diagram illustrating the operation of the circuit related to the output of the signal to the signal line 7 and the transmission of the output to the detection circuit 15. As described above, once the output of the PD 82 is reset, the potential of the coupling part CP becomes the initial potential. The potential of the coupling part CP is lowered because the charge stored in a capacitance C1 is discharged from the PD 82 in accordance with the intensity of the light detected by the PD 82 until the output of the PD 82 is reset again. In FIG. 4, the electrostatic capacitance at the coupling part CP is indicated by the capacitance C1. The source potential of the transistor element 83, thus, depends on the capacitance C1. When the PD 82 does not detect light at all, the potentials at opposite ends of the capacitance C1 do not change from their initial potentials because actually no current flows through the PD 82. Depending on the degree to which the PD 82 detects light, the capacitance C1 changes such that the potential is lowered from the initial potential.

The electrostatic capacitance at the coupling position between the source of the transistor element 83 and one of the source and the drain of the switching element 85 is defined as a capacitance C2. The electrostatic capacitance corresponding to the other of the source and the drain of the switching element 85 is defined as a capacitance C3. The output of the scan signal couples the source and the drain of the switching element 85.

The signal line 7 interposed between the other of the source and the drain of the switching element 85 and an AFE 31 in the detection circuit 15 has an electrical resistance (resistor) ER corresponding to its extending length. A current source 32 is provided to branch off from the signal line 7. The current source 32 causes a constant current to flow out from the signal line 7, resulting in a voltage being generated between the other of the source and the drain of the switching element 85 and the AFE 31, the voltage depending on the current value flowing in the electrical resistor ER. A capacitance C4 stabilizes the potential of the signal line 7, for example. Hereafter, a bias current refers to the current given (flowing) from the current source 32 to the signal line 7. The current source 32 provides the bias current and is provided in the detection circuit 15, for example.

As illustrated in FIG. 4, the capacitance C1 can be regarded as a capacitive element. The signal line (coupling part CP) is coupled to one end of the capacitance C1 while a reference potential (GND) is applied to the other end of the capacitance C1. The capacitance C2 can be regarded as a capacitive element. The signal transmission path between the transistor element 83 and the switching element 85 is coupled to one end of the capacitance C2 while the reference potential (GND) is applied to the other end of the capacitance C2. The capacitance C3 can be regarded as a capacitive element. The signal transmission path between the switching element 85 and the detection circuit 15 is coupled to one end of the capacitance C3 while the reference potential (GND) is applied to the other end of the capacitance C3. The capacitance C4 can be regarded as a capacitive element. The signal transmission path between the switching element 85 and the detection circuit 15 is coupled to one end of the capacitance C4 while the reference potential (GND) is applied to the other end of the capacitance C4. The capacitances C1 to C4 may be, instead of the capacitive elements, parasitic capacitances of the respective elements.

Changing the potential of the coupling part CP from the initial potential causes change of the potential of the transistor element 83. In other words, changing the initial potential causes changing the potential of the signal line 7 accordingly. The level of the potential of the signal line 7, thus, can also be controlled by controlling the level of the initial potential. Changing the bias current causes changing the potential difference between both ends of the electrical resistor ER, thereby making it possible to change the potential of the signal line 7.

The AFE 31 serves an analog front end (AFE) circuit. The AFE 31 generates a signal based on the input applied via the signal line 7, and outputs the generated signal to the host 30.

Figure 5:
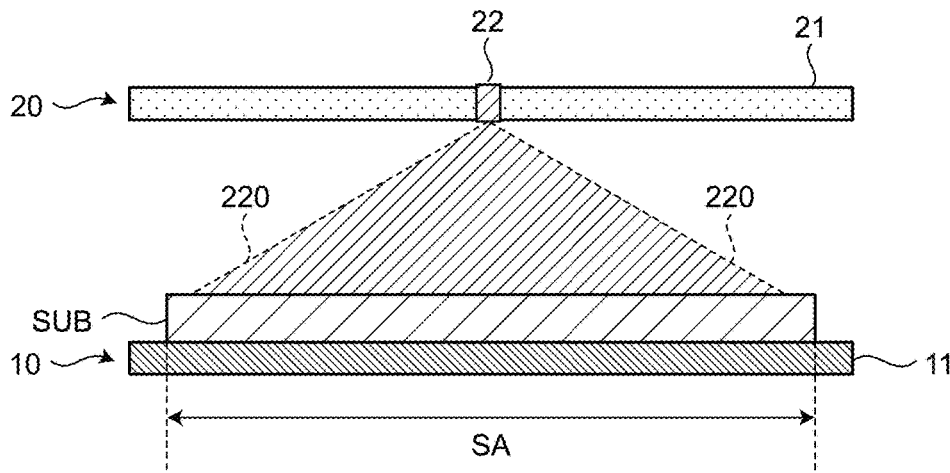
FIG. 5 is a schematic diagram illustrating a mode of the detection device in operation.
Figure 5:
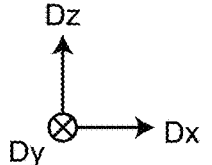

The following describes a mode of the detection device 1 in operation with reference to FIG. 5.

FIG. 5 is a schematic diagram illustrating a mode of the detection device 1 in operation. The detection device 1 is installed such that the light source panel 20 and the sensor panel 10 face each other in the third direction Dz with an object to be detected SUB therebetween. The object to be detected SUB is a Petri dish in which a culture medium such as an agar medium is formed, but is not limited thereto, and may have other components that transmit the light from the light source panel 20. The object to be detected SUB is placed within the detection region SA on the substrate 11. The light source panel 20 emits light from above the object to be detected SUB toward the sensor panel 10 by turning on the light source 22. FIG. 5 illustrates a case where the light source 22 located at or near the center in the first direction Dx is turned on. In FIG. 5, the spread of light emitted from the light source 22 and directed toward the object to be detected SUB is denoted as an illumination area 220. Of the light emitted from the light source 22 and directed toward the object to be detected SUB, the light transmitted through the object to be detected SUB is detected by the PDs 82 (refer to FIGS. 3 and 4) in the detection region SA. Hereafter, the term "sensor scan" refers to processing in which the sensor panel 10 detects the light emitted from the light source panel 20 and transmitted through the object to be detected (e.g., the object to be detected SUB) while the positional relation is established between the sensor panel 10 and the light source panel 20 that face each other with an object to be detected therebetween.

The intensities of light detected by the PDs 82 in the detection region SA can be different from one another even when the PDs 82 detect light from the same light source. The following describes the intensity of light detected within the detection region SA with reference to FIG. 6.

Figure 6:
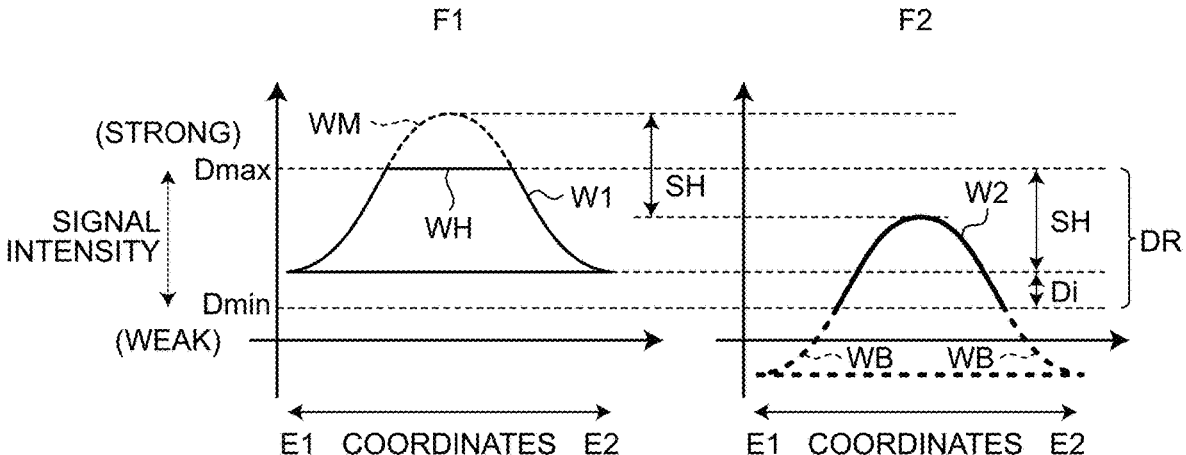
FIG. 6 is a graph illustrating a relation between a signal intensity recognized by an AFE and the coordinates of the detection region.

FIG. 6 is a graph illustrating a relation between a signal intensity recognized by the AFE 31 and the coordinates of the detection region SA. Hereafter, the signal intensity refers to the signal intensity recognized by the AFE 31, unless otherwise noted. The signal intensity corresponds to the intensity of light detected by the PD 82. The coordinate "E1" in the coordinates of the detection region SA indicated by the horizontal axis of the graph illustrated in FIG. 6, indicates one end of the detection region SA along one of the first direction Dx and the second direction Dy. The coordinate "E2" indicates the other end of the detection region SA along the direction. In the explanation with reference to FIG. 6, the one of the directions is the first direction Dx in line with FIG. 5. The graph in FIG. 6 schematically illustrates the signal intensity according to the illumination area 220 illustrated in FIG. 5. FIG. 6 illustrates the graphs of a first period F1 and a second period F2.

As illustrated in the graph of the first period F1 in FIG. 6, the signal intensity can vary depending on the coordinates of the detection region SA. As denoted as a clipped portion WH in FIG. 6, the signal intensity remains high at and near the intermediate point between the coordinates E1 and E2. This is due to a dynamic range DR of the AFE 31. The dynamic range DR is defined by the lower limit (Dmin) and the upper limit (Dmax) of the signal that can be processed by the AFE 31. The clipped portion WH is caused by the upper limit (Dmax) of the dynamic range DR. If there is no limit on the signal intensity due to the upper limit (Dmax), the distribution of the signal intensity depending on the intensity of light detected by each of the PDs 82 aligned along the horizontal axis (coordinates) is a sinusoidal distribution formed by a solid curve W1 and a dashed curve WM in the graph of the first period F1 in FIG. 6. This is due to the fact that the PD 82 detects stronger light as the PD 82 is closer to the light source 22 that is turned on.

Conversely, in the first period F1, the output corresponding to the solid graph formed by the solid curve W1 and the clipped portion WH is regarded as "the output of one sensor scan corresponding to the lighting pattern of a certain light source 22" corresponding to the output from the sensors WA. In other words, the output obtained by combining the outputs of the sensors WA at a certain point in time (e.g., the readout period RD, which is described later) is regarded as the output from the detection region SA.

As described with reference to FIG. 4, the signal intensity (the potential of the signal line 7) can be changed by changing at least one of the bias current and the initial potential. Thus, when the output corresponding to the upper limit (Dmax) of the dynamic range DR, such as the output corresponding to the clipped portion WH in the graph of the first period F1 in FIG. 6, is generated, reducing the signal intensity can eliminate the signal identification limit that would be caused by the upper limit (Dmax).

The graph of the second period F2 in FIG. 6 differs from the graph of the first period F1 in FIG. 6 in that the signal intensity is shifted down by an amount SH. This allows the AFE 31 to recognize, in the second period F2, the distribution of the signal intensity corresponding to the solid curve W2 including the portion indicated with the dashed curve WM that AFE 31 cannot recognize in the first period F1. On the other hand, in the second period F2, the portion indicated with the dashed curve WB falls below the lower limit (Dmin), thereby making it impossible for the AFE 31 to recognize the signals and identify the signal intensities corresponding to those in the portion. Changing the signal intensity makes it possible to change the relation between the distribution of the signal intensity depending on the intensity of the light detected by each of the PDs 82 and the dynamic range DR.

When the difference between the lower and upper limits of the signal intensity in the distribution of the signal intensity depending on the light intensity detected by each of the PDs 82 exceeds the dynamic range DR, the AFE 31 does not fully identify the distribution of the signal intensity depending on the light intensity detected by each of the PDs 82 in a case where the AFE 31 is simply operated. In this case, as in the first period F1 and the second period F2 described with reference to FIG. 6, by using results of two detections obtained by changing the signal intensity, it is possible to more reliably identify the distribution of the signal intensity depending on the light intensity detected by each of the PDs 82. Here, the amount of signal intensity shift (the shift amount SH) when changing the signal intensity from that in the first period F1 to that in the second period F2, is equal to or smaller than the difference (upper-lower difference) between the upper (Dmax) and lower (Dmin) limits of the dynamic range DR. In the example illustrated in FIG. 6, the shift amount SH is less than the upper-lower difference. The overlapping range Di illustrated in FIG. 6 is the difference by subtracting the shift amount SH from the upper-lower difference. In other words, the signals in the portion included in the overlapping range Di are recognized both in the first period F1 and in the second period F2. When the results of two detections are used, signal combining processing is performed with a countermeasure against the overlapping of the portion included in the overlapping range Di.

Figure 7:
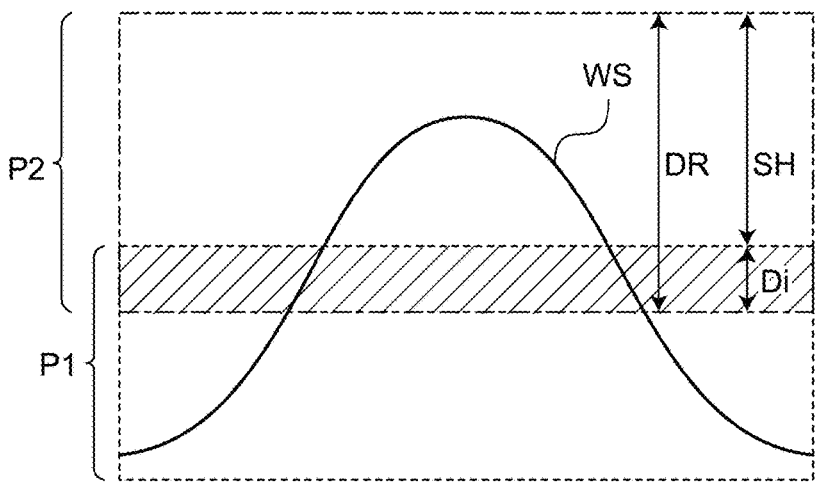
FIG. 7 is a schematic diagram illustrating a principle of signal combining processing.

FIG. 7 is a schematic diagram illustrating a principle of the signal combining processing. In FIG. 7, the signals output in the first period F1 illustrated in FIG. 6 are denoted as a first signal P1. In FIG. 7, the signals output in the second period F2 illustrated in FIG. 6 are denoted as a second signal P2. In the signal combining processing, the first signal P1 and the second signal P2 are added together, and the signal of the portion (overlapping portion) included in the overlapping range Di is subtracted from the signal obtained by the addition operation. This generates a combined signal WS that reflects the countermeasure against both the distribution of the signal intensity exceeding the dynamic range DR and the overlapping of the portion included in the overlapping range Di. In the signal combining processing, the combined signal WS may be obtained by subtracting the overlapping portion from one of the first signal P1 and the second signal P2 and then adding the signal obtained by the subtraction operation and the other of the first signal P1 and the second signal P2 together.

In the embodiment, determining whether the AFE 31 receives the input of the signal corresponding to the upper limit (Dmax) of the dynamic range DR and changing the signal intensity when receiving the input, are performed by the detection circuit 15, for example. The signal combining processing is performed by the host 30, for example. The detection circuit 15 may have the function to perform the signal combining processing. In a case where no clipped state occurs, it is determined that there is no need to perform the detection corresponding to the second period F2 for the signal combining processing. The term "clipped state" means that the signal intensity reaches the upper limit (Dmax) of the dynamic range DR at one or more coordinates. When the clipped state occurs, it is impossible to determine whether the signal intensity equals or exceeds the upper limit of the dynamic range DR, and therefore the detection corresponding to the second period F2 for the signal combining processing is performed.

In the embodiment, the signal intensity is pre-set such that the signal intensity exceeds the lower limit (Dmin) of the dynamic range DR when the PDs 82 detect no light at all for the first period F1. The distribution of the signal intensity that exceeds the dynamic range DR is, thus, limited to that exceeds the upper limit (Dmax) of the dynamic range DR.

The following describes the specific methods of changing the signal intensity in turn: when the bias current is changed and when the initial potential is changed.

FIG. 8 is a timing chart illustrating an example of the main signal control for the first period F1 and the second period F2 when the bias current is changed in a case where the clipped state occurs. CL1 in FIG. 8 and FIG. 9, which is described later, denotes the reset signal. CL2 in FIGS. 8 and 9 denotes the scan signal. Vo in FIG. 8 denotes the bias current.

The light detection processing, which is performed a plurality of times, such as the first period F1 and the second period F2, is performed at intervals of a unit time. The time length of the first period F1 and the time length of the second period F2 are substantially the same. The ratio of time lengths that are respectively allocated for the reset period RT, the exposure period EX, and the readout period RD included in each unit time is also substantially the same between the first period F1 and the second period F2. The start timing control of the reset period RT and the readout period RD is performed by the detection circuit 15.

In each of the first period F1 and the second period F2, the reset signal is first applied to the reset signal transmission line 5 from the reset circuit 13 during the reset period RT. This causes the coupling part CP (the potential at one end of the capacitance C1) to have the initial potential. Thereafter, the potential of one end of the capacitance C1 and the potential of one end of the capacitance C2 change with the intensity of the light detected by the PD 82 during the exposure period EX. The scan signal is applied to the scan line 6 from the scan circuit 14 during the readout period RD, thus causing the signal (potential) that is input via the signal line 7 to have the signal intensity (potential) corresponding to the potential of one end of the capacitance C2.

The bias current is changed at the timing of the boundary between the first period F1 and the second period F2. In the example illustrated in FIG. 8, the bias current is raised, resulting in a change that lowers the potential level at one end of the capacitance C4. This allows the signal intensity in the second period F2 to be reduced to be lower than that in the first period F1, as described with reference to FIG. 6.

FIG. 9 is a timing chart illustrating an example of the main signal control in the first period F1 and second period F2 when the initial potential is changed in a case where the clipped state occurs. VReset in FIG. 9 denotes the reset potential VReset described with reference to FIGS. 3 and 4. VCOM in FIG. 9 denotes the reference potential VCOM described with reference to FIGS. 3 and 4.

The example illustrated in FIG. 9 differs from FIG. 8 in that the initial potential is changed instead of the bias current at the timing of the boundary between the first period F1 and the second period F2. Specifically, the reset potential VReset and the reference potential VCOM are lowered at the timing of the boundary between the first period F1 and the second period F2. This lowers the potential level at one end of the capacitance C4, thereby making it possible to reduce the signal intensity in the second period F2 to be lower than that in the first period F1. Except for the above noted matters, the signal control in FIG. 9 is the same as that in FIG. 8. When the characteristics of the photodiode do not change regardless of the reverse bias voltage between the anode and cathode of the PD 82, only the reset potential VReset may be changed without changing the reference potential VCOM.

The shape of the graph illustrating the relation between the coordinates and the signal intensity described with reference to FIG. 6 is that in a case where the light source 22 located at or near the center of the luminous region LA is turned on as described with reference to FIG. 5. The peak in the distribution of the signal intensity corresponding to the sinusoidal graph corresponds to the position of the light source 22 that is turned on. In the sensor scan, the processing is repeated in which one, or two or more of the light sources 22 is/are turned on (lit), and the outputs from the sensors WA corresponding to the lighting of the light sources 22 are received. The host 30 integrates the outputs received from such repeated processing to obtain the sensing result of the object to be detected (e.g., the object to be detected SUB). In the repeated processing, all of the light sources 22 are each turned on at least once.

Alternatively, both the bias current and the initial potential may be changed to change the signal intensity. However, changing the signal intensity by changing the bias current or the initial potential makes the processing for changing the signal intensity simpler. The following describes the control flow described above with reference to the flowchart in FIG. 10.

Figure 10:
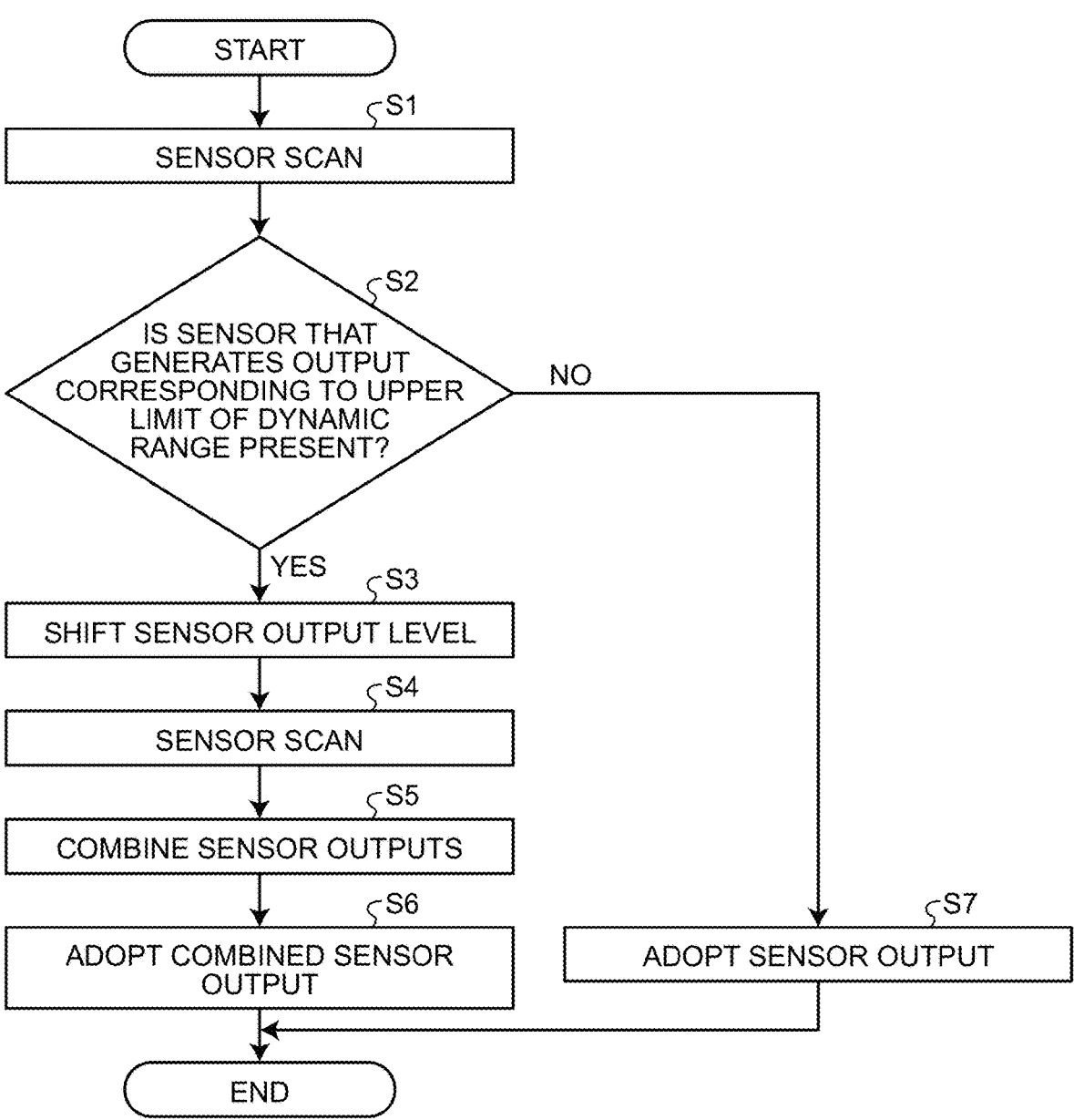
FIG. 10 is a flowchart illustrating processing of a sensor scan.

FIG. 10 is the flowchart illustrating the processing of the sensor scan. First, the sensor scan is performed (step S1). As a result of the sensor scan at step S1, it is determined whether the sensor WA is present that has generated an output of the signal corresponding to (or exceeding) the upper limit (Dmax) of the dynamic range DR (step S2).

If it is determined at step S2 that the sensor WA is present that has generated an output of the signal corresponding to (or exceeding) the upper limit (Dmax) of the dynamic range DR (Yes at step S2), the sensor output level is shifted (step S3). Specifically, the processing is performed in which the signal intensity is changed by changing at least one of the bias current and the initial potential to reduce the output level of the sensor WA in the sensor scan that is performed at the next step.

After the processing at step S3, the sensor scan is performed again (step S4). The sensor scan at step S4 corresponds to that for the second period F2 described above. When the processing at step S4 is performed, the sensor scan at step S1 corresponds to that for the first period F1 described above.

After the processing at step S4, the output from the sensor scan at step S1 and the output from the sensor scan at step S4 are combined (step S5). Specifically, the processing is performed that subtracts overlapped output of the two sensor scans from the sum of the outputs of the two sensor scans, as described with reference to FIG. 7. The output combined by the processing at step S5 is adopted as the output of the sensor scan (step S6).

On the other hand, if it is determined at step S2 that the outputs of all the sensors WA do not correspond to the upper limit (Dmax) of the dynamic range DR (No at step S2), the output obtained at step S1 is adopted as the sensor scan output (step S7).

As described above, according to the embodiment, the detection device 1 includes the sensors WA each of which includes the PD 82 detecting light and generates the output corresponding to the degree of the detected light, and the detection circuit 15 that receives the output of each of the sensors WA. The PD 82 has the anode to which the reference potential VCOM is applied and the cathode to which the reset potential VReset is applied. The sensor WA generates the output corresponding to the degree of light detected by the PD 82 after the reset potential VReset is applied to the cathode and before the reset potential VReset is applied to the cathode again. The outputs of the sensors WA are received in the first period F1. The outputs of the sensors WA are received in the second period F2 after the first period F1. The reference potential VCOM and the reset potential VReset in the first period F1 are different from those in the second period F2.

According to the embodiment, the detection device 1 includes the sensors WA each of which includes the PD 82 detecting light and generates the output corresponding to the degree of the detected light, and the detection circuit 15 that receives the output of each of the sensors WA. The PD 82 has the anode to which the reference potential VCOM is applied and the cathode to which the reset potential VReset is applied. A configuration (the signal line 7) that functions as an electrical resistor (the electrical resistor ER) is interposed between the sensor WA and the detection circuit 15. The current source 32 providing the bias current is coupled to the coupling path between the electrical resistor and the detection circuit 15. The outputs of the sensors WA are received in the first period F1. The outputs of the sensors WA are received in the second period F2 after the first period F1. The bias current in the first period F1 is different from that in the second period F2.

Both configurations described above can adjust the level of the signal (the signal intensity) that is input to the detection circuit 15 as the output of the sensor WA. Therefore, even if the range between the lower and upper limits of the output of the sensor WA depending on the degree of light detected by the PD 82 exceeds the range between the lower and upper limits that the detection circuit 15 can recognize (e.g., the dynamic range DR), two sensor scans of the first period F1 and the second period F2 make the output of the sensor WA easier to be adjusted within the range that the detection circuit 15 can recognize, by adjusting the levels of the signals in the first period F1 and second period F2. This makes it possible to achieve the sensing fully utilizing the ability of the sensor WA, in other words, the ability of the PD 82 provided in the sensor WA.

When the outputs of the sensors WA in the first period F1 are all within a range between the lower and upper limits of the input that can be recognized by the detection circuit 15, the second period F2 can be omitted. In this way, when it is not necessary to perform the second period F2, the second period F2 can be omitted to fully utilize the ability of the PDs 82 in the sensors WA. This makes it possible to provide the detection device with more immediate response.

In each of the first period F1 and the second period F2, the combination of the outputs of the sensors WA is regarded as the output from the detection region SA in which the sensors WA are arranged, whereby a two-dimensional sensor output can be obtained.

Assuming that a first output is defined as the output from the detection region SA in the first period F1 (e.g., the first signal P1), and a second output is defined as the output from the detection region SA in the second period F2 (e.g., the second signal P2). In this case, when the detection circuit 15 receives both the first output and the second output, the detection circuit 15 subtracts the overlapping portion of the first output and the second output (e.g., a portion within the overlapping range Di) from one of the first output and the second output and then combines the output obtained by the subtraction operation and the other of the first and the second outputs; or when the detection circuit 15 receives both the first output and the second output, the detection circuit 15 combines the first and the second outputs and then subtracts the overlapping portion from the output obtained by combining the first and the second outputs. Thus, the sensor output received through two sensing operations in the first period F1 and the second period F2 can be adopted as an output indicating the result of sensing that fully utilizes the ability of the PDs 82 provided in the sensors WA.

The sensors WA are arranged in a matrix having a row-column configuration, and each of the sensors WA is coupled to the scan line and the signal line, wherein the scan line is a line for transmitting the scan signal that causes the sensor WA to generate the output, and the signal line is a line for transmitting the output from the sensor WA. This configuration allows more effective arrangement of the sensors WA.

The detection device 1 includes the light sources 22 that emit light. The light sources 22 and the sensor panel 10 that has the detection region SA in which the sensors WA are arranged to face each other with a culture medium (e.g., the object to be detected SUB) interposed therebetween. This configuration allows light emitted from the light sources 22 and transmitted through the culture medium to be detected in the detection region SA. In other words, the state of the culture medium can be sensed.

The range (e.g., the dynamic range DR) between the lower and upper limits of the input recognizable by the detection circuit 15 is smaller than the range between the lower and upper limits of the output of the sensor WA. The level of the output of the sensor WA is adjusted by shifting the level such that the output of the sensor WA is within the range recognizable by the detection circuit 15 through two sensing operations in the first period F1 and in the second period F2. This makes it more meaningful to utilize the ability of the sensor WA.

Other operational advantages accruing from the aspects described in the present embodiment that are obvious from the description herein, or that are conceivable as appropriate by those skilled in the art will naturally be understood as accruing from the present disclosure.

What is claimed is:

1. A detection device comprising:

a plurality of sensors each of which includes a photodiode configured to detect light and is configured to generate an output corresponding to a degree of the detected light; and a detection circuit that is configured to receive the output of each of the sensors, wherein the photodiode has an anode to which a reference potential is applied and a cathode to which a reset potential is applied, the reset potential is higher than the reference potential, each of the sensors is configured to generate the output corresponding to the degree of the light detected by the photodiode after the reset potential is applied to the cathode and before the reset potential is applied to the cathode again, the outputs of the sensors are received in a first period, the outputs of the sensors are received in a second period after the first period, and the reference potential and the reset potential in the first period are different from those in the second period.

2. The detection device according to claim 1, wherein the second period is omitted when the outputs of the sensors in the first period are all within a range between lower and upper limits of an input recognizable by the detection circuit.

3. The detection device according to claim 1, wherein in each of the first and second periods, the combination of the outputs of the sensors is regarded as an output from a detection region in which the sensors are arranged.

4. The detection device according to claim 3, wherein, when receiving both a first output that is the output from the detection region in the first period, and a second output that is the output from the detection region in the second period, the detection circuit subtracts an overlapping portion of the first and second outputs from one of the first output and the second output and combines an output obtained by the subtraction operation and the other of the first and the second outputs, or combines the first and the second outputs and subtracts the overlapping portion from an output obtained by combining the first and the second outputs.

5. The detection device according to claim 1, wherein the sensors are arranged in a matrix having a row-column configuration, and each of the sensors is coupled to a scan line for transmitting a scan signal that causes the sensor to generate the output and a signal line for transmitting the output from the sensor.

6. The detection device according to claim 1, further comprising a light source configured to emit light, wherein the light source and a sensor panel having a detection region in which the sensors are arranged face each other with a culture medium interposed therebetween.

7. The detection device according to claim 1, wherein a range between lower and upper limits of an input recognizable by the detection circuit is smaller than a range between lower and upper limits of the output of the sensor.

8. A detection device comprising:

a plurality of sensors each of which includes a photodiode configured to detect light and is configured to generate an output corresponding to a degree of the detected light; and a detection circuit that is configured to receive the output of each of the sensors, wherein the photodiode has an anode to which a reference potential is applied and a cathode to which a reset potential is applied, the reset potential is higher than the reference potential, a configuration that functions as an electrical resistor is interposed between each of the sensors and the detection circuit, a current source that is configured to provide a bias current is coupled to a coupling path between the electrical resistor and the detection circuit, the outputs of the sensors are received in a first period, the outputs of the sensors are received in a second period after the first period, and the bias current in the first period is different from the second period.

9. The detection device according to claim 8, wherein the second period is omitted when the outputs of the sensors in the first period are all within a range between lower and upper limits of an input recognizable by the detection circuit.

10. The detection device according to claim 8, wherein in each of the first and second periods, the combination of the outputs of the sensors is regarded as an output from a detection region in which the sensors are arranged.

11. The detection device according to claim 10, wherein, when receiving both a first output that is the output from the detection region in the first period, and a second output that is the output from the detection region in the second period, the detection circuit subtracts an overlapping portion of the first and second outputs from one of the first output and the second output and combines an output obtained by the subtraction operation and the other of the first and the second outputs, or combines the first and the second outputs and subtracts the overlapping portion from an output obtained by combining the first and the second outputs.

12. The detection device according to claim 8, wherein the sensors are arranged in a matrix having a row-column configuration, and each of the sensors is coupled to a scan line for transmitting a scan signal that causes the sensor to generate the output and a signal line for transmitting the output from the sensor.

13. The detection device according to claim 8, further comprising a light source configured to emit light, wherein the light source and a sensor panel having a detection region in which the sensors are arranged face each other with a culture medium interposed therebetween.

14. The detection device according to claim 8, wherein a range between lower and upper limits of an input recognizable by the detection circuit is smaller than a range between lower and upper limits of the output of the sensor.

* * * * *